(12) United States Patent
Salesse-Lavergne

(10) Patent No.: US 9,862,500 B2
(45) Date of Patent: Jan. 9, 2018

(54) METHOD OF DETERMINING THE LONGITUDINAL AIR SPEED AND THE LONGITUDINAL GROUND SPEED OF A ROTARY WING AIRCRAFT DEPENDING ON ITS EXPOSURE TO THE WIND

(71) Applicant: AIRBUS HELICOPTERS, Marignane (FR)

(72) Inventor: Marc Salesse-Lavergne, Allauch (FR)

(73) Assignee: AIRBUS HELICOPTERS, Marignane (FR)

( * ) Notice: Subject to any disclaimer, the term of this patent is extended or adjusted under 35 U.S.C. 154(b) by 92 days.

(21) Appl. No.: 15/163,834

(22) Filed: May 25, 2016

(65) Prior Publication Data

US 2016/0347467 A1 Dec. 1, 2016

(30) Foreign Application Priority Data

May 28, 2015 (FR) ...................................... 15 01096

(51) Int. Cl.
*B64D 43/02* (2006.01)
*B64C 13/04* (2006.01)
(Continued)

(52) U.S. Cl.
CPC .............. *B64D 43/02* (2013.01); *B64C 13/04* (2013.01); *B64C 13/18* (2013.01); *B64C 13/22* (2013.01); *G05D 1/0858* (2013.01)

(58) Field of Classification Search
None
See application file for complete search history.

(56) References Cited

U.S. PATENT DOCUMENTS

| 5,001,646 A | 3/1991 | Caldwell et al. |
| 5,213,283 A | 5/1993 | Gold et al. |

(Continued)

FOREIGN PATENT DOCUMENTS

| FR | 1347243 | 12/1963 |
| FR | 2741855 | 6/1997 |

(Continued)

OTHER PUBLICATIONS

French Search Report for French Application No. FR 1501096, Completed by the French Patent Office on Apr. 15, 2016, 10 Pages.

*Primary Examiner* — Redhwan K Mawari
*Assistant Examiner* — Edward Torchinsky
(74) *Attorney, Agent, or Firm* — Brooks Kushman P.C.

(57) ABSTRACT

A method of determining the longitudinal air speed $V_{airX}$ and the longitudinal ground speed $V_{solX}$ of a rotary wing aircraft depending on the exposure of the aircraft to the wind, the aircraft flying at a speed of advance Va. The method making it possible to determine characteristic speed curves for the aircraft depending on the longitudinal speed of the relative wind to which the aircraft is subjected, and then during a flight and depending on the actions of the pilot of the aircraft, to deduce the longitudinal ground speed $V_{solX}$ and the longitudinal air speed $V_{airX}$ to be applied to the aircraft depending on variations in the longitudinal speed of the relative wind to which the aircraft is subjected.

15 Claims, 2 Drawing Sheets

(51) Int. Cl.
    *B64C 13/18*     (2006.01)
    *B64C 13/22*     (2006.01)
    *G05D 1/08*     (2006.01)

(56) References Cited

U.S. PATENT DOCUMENTS

| | | |
|---|---|---|
| 5,863,012 A | 1/1999 | Rollet et al. |
| 6,259,975 B1 | 7/2001 | Rollet et al. |
| 6,622,065 B2 | 9/2003 | Mezan |
| 8,977,412 B2 | 3/2015 | Certain |

FOREIGN PATENT DOCUMENTS

| | | |
|---|---|---|
| FR | 2777535 | 10/1999 |
| FR | 2814433 | 3/2002 |
| FR | 2991664 | 12/2013 |
| WO | 9534029 | 12/1995 |
| WO | 2012096668 | 7/2012 |
| WO | 2012134447 A2 | 10/2012 |
| WO | 2012134447 A3 | 10/2012 |
| WO | 2012134460 | 10/2012 |
| WO | 2013012408 | 1/2013 |

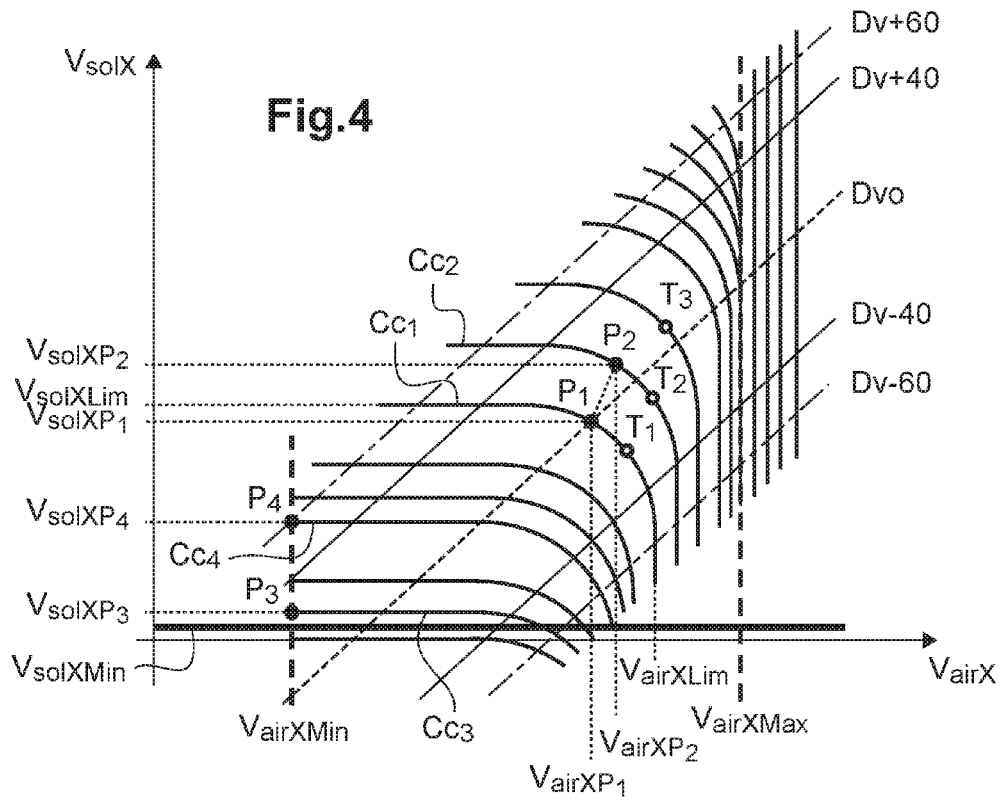
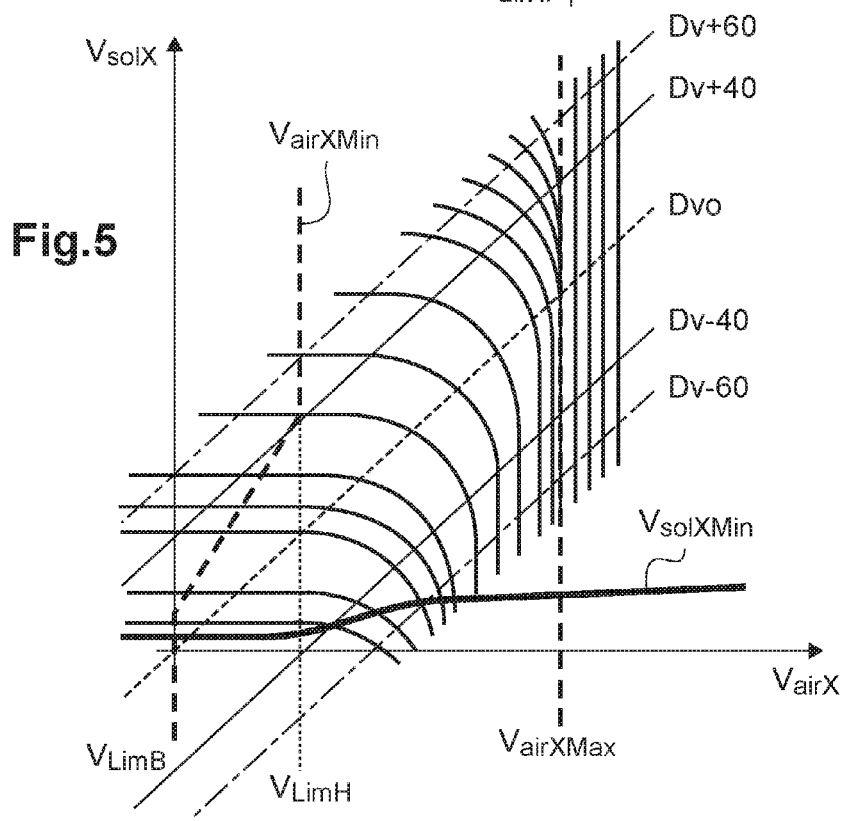

METHOD OF DETERMINING THE LONGITUDINAL AIR SPEED AND THE LONGITUDINAL GROUND SPEED OF A ROTARY WING AIRCRAFT DEPENDING ON ITS EXPOSURE TO THE WIND

CROSS REFERENCE TO RELATED APPLICATION

This application claims priority to French patent application No. FR 15 01096 filed on May 28, 2015, the disclosure of which is incorporated in its entirety by reference herein.

BACKGROUND OF THE INVENTION (1) Field of the Invention

The present invention relates to the field of flight control systems for rotary wing aircraft, and more particularly to providing assistance in using flight controls such as an autopilot.

The present invention relates to a method of determining the projection of the "air speed" and the projection of the "ground speed" of a rotary wing aircraft in a longitudinal direction of said aircraft and as a function of its exposure to the wind. The present invention also relates to a system for determining the projection of the air speed and the projection of the ground speed of a rotary wing aircraft.

The term "air speed" means the speed of advance of the rotary wing aircraft relative to the air, and the term "ground speed" means the speed of advance of the rotary wing aircraft relative to the ground.

For the purposes of simplifying the description, use is made below of the term "longitudinal air speed $V_{airX}$" to designate the projection of the air speed of the aircraft in the longitudinal direction of the aircraft. Likewise, use is made of the term "longitudinal ground speed $V_{solX}$" to designate the projection of the ground speed of the aircraft in the longitudinal direction of the aircraft.

(2) Description of Related Art

Rotary wing aircraft are aircraft that differ from other powered aircraft mainly by their ability to travel not only in cruising flight at high speeds, but also at low speeds or while hovering. This capacity is made available by using at least one main rotor of the aircraft, which rotor has an axis of rotation that is substantially vertical.

The main rotor constitutes a rotary wing providing the aircraft with lift and possibly also with propulsion. The behavior of the rotary wing aircraft in flight can be modified by varying the cyclic pitch and/or the collective pitch of the blades of the rotary wing. A variation in the cyclic pitch of the blades modifies the behavior of the aircraft in terms of attitude, and more particularly in pitching and/or in roll. A variation in the collective pitch of the blades leads to a modification in the behavior of the aircraft in terms of lift, making it possible in particular to generate movements along an axis that is substantially vertical, and also along its pitching and roll axes, depending on the attitude of the aircraft.

A rotary wing aircraft can also be maneuvered in yaw, even while stationary, by using a yaw anti-torque device. For example, such an anti-torque device is formed by a tail rotor having an axis of rotation that is substantially horizontal and located at the rear of the aircraft. Such a tail rotor has a plurality of blades, and as a general rule it is only the collective pitch of the blades that can be varied, even though it is also possible for the cyclic pitch to be variable.

A rotary wing aircraft generally has a single main rotor and a single anti-torque tail rotor. Nevertheless, a rotary wing aircraft may also have two contrarotating main rotors, e.g. in tandem or else on the same axis, in which case no anti-torque device is necessary.

Furthermore, a hybrid helicopter is a rotary wing aircraft having at least one main rotor that serves mainly to provide it with lift and to a smaller extent with propulsion, and at least one specific propulsion means such as a propulsive propeller. Such a hybrid helicopter enables large distances to be covered while traveling at a high speed of advance. The anti-torque device of such a hybrid helicopter may be formed by at least one of its propulsive propellers. Such a propulsive propeller has a plurality of blades and as a general rule only their collective pitch is variable.

Furthermore, a rotary wing aircraft may have aerodynamic elements such as stabilizers, or even wings, particularly in hybrid helicopters. These aerodynamic elements may have moving parts and they can participate in making the aircraft maneuverable, in particular in cruising flight at high speeds of advance.

The flight behavior of a rotary wing aircraft can be varied by modifying various flight parameters of the aircraft. These flight parameters include in particular cyclic and/or collective pitch values for the blades of the main rotors and the collective pitch value for the blades of the anti-torque rotor and/or the propulsion means, and the aerodynamic elements, if any. These flight parameters can be modified in this way in various control modes. In a manual control mode the pilot of the rotary wing aircraft has control levers that the pilot of the aircraft moves manually in order to vary the flight parameters, and in particular the cyclic and/or collective pitch of the blades of the various rotors by means of manual control linkages. The concept of "manual" should be considered in opposition to the concept of "automatic", without prejudice to the means used by a person for maneuvering the aircraft, which means may in particular be pedals, a control stick, or a joystick.

In an embodiment of a manual control mode, control levers engage respective linkages for mechanically transmitting forces remotely, so as to enable the pilot of the rotary wing aircraft to act mechanically on the blades by using control levers, either directly, or else via servo-controls.

In another embodiment of a manual control mode, the pilot moving a control lever serves to generate electrical signals for activating at least one servo-control for moving the blades.

In an automatic control mode, an autopilot generates control signals for those flight parameters and in particular for varying the pitch of the blades of the various rotors by using automatic control linkages. When the autopilot is activated, the control signals take the place of the control signals generated by the pilot acting directly on the control levers for activating the servo-controls.

The autopilot enables the rotary wing aircraft to maintain stable progress in application of previously stored flight setpoints. The actual state of progress of the aircraft is evaluated by the autopilot at a given instant by means of information supplied by a variety of instrumentation on board the aircraft. On the autopilot detecting a difference between the flight setpoints and the actual state of progress of the aircraft, the autopilot acts on the flight behavior of the rotary wing aircraft by means of one or more flight parameters in order to re-establish its actual state of progression in compliance with the flight setpoints.

The pilot of the rotary wing aircraft activates the autopilot by using one or more specific control buttons.

In a stabilization mode performed by the autopilot, an initial setpoint for maintaining the attitude of the rotary wing aircraft may, for example, be defined relative to the state of progression of the aircraft as evaluated from activation of the autopilot. Stabilization mode serves to stabilize the aircraft by the autopilot correcting the attitude of the aircraft relative to the initial setpoint.

In a particular mode of piloting by transparency, the pilot may possibly intervene temporarily on the behavior of the aircraft by using control levers and overriding the control signals generated by the autopilot. The initial flight setpoints are unaffected, any temporary intervention by the pilot on the behavior of the aircraft not leading to any modification to the initial flight setpoints.

It is also known to correct a flight setpoint, such as a setpoint for maintaining attitude, as a function of the actual state of progression of the rotary wing aircraft after the pilot has acted on the control levers. It is also known to enable the pilot of the aircraft to correct an attitude maintaining setpoint by varying the value of that setpoint incrementally, the pilot making use of one or more dedicated control members. For example, two control members may be used of the kind commonly known as "beeps". For example, such control members may be positioned respectively on a collective pitch control lever and on a cyclic pitch control lever generally referred to as a "stick".

Document FR 1 347 243 describes a device for piloting by transparency that enables the pilot to take action either with a return to the initial flight setpoints after the pilot's action ceases or else with new flight setpoints being stored that take account of the action of the pilot.

Also known is Document FR 2 991 664, which describes an automatic system for providing piloting assistance that enables a flight parameter to be maintained on a progression axis of the aircraft while taking account of the action of the aircraft pilot on at least one other axis by using flight control levers while the autopilot of the aircraft is in operation. Various modes of guidance can be selected by the pilot, e.g. giving priority to maintaining a vertical speed or a speed of advance or indeed maintaining heading, angle of attack, or pitch angle.

Furthermore, Document U.S. Pat. No. 5,001,646 describes an automatic control system enabling the pilot to act on the progression of the aircraft by means of a four-axis control member. The pilot can then control longitudinal, lateral, and vertical accelerations of the aircraft and also its angular speed in yaw, while conserving firstly, at a low speed of advance, a speed relative to the ground that is independent of the heading being followed, and secondly, at a high speed of advance, a coordinated turn and a flight path angle.

The rotary wing aircraft is stabilized using basic modes, in which, by way of example, the autopilot generates an increase in stability by damping angular movements of the aircraft, or indeed it serves to maintain attitude or heading. The basic modes provide piloting comfort for the pilot of the rotary wing aircraft, but they do not correct for potential differences relative to the speed or position the pilot desires for the aircraft. Proposals have thus been made to associate higher modes of operation with the basic modes in order to eliminate potential differences in position, speed, and/or acceleration of the aircraft compared with the values desired by the pilot. These desired values are input in the form of flight setpoints that the higher autopilot modes use for bringing the aircraft to the desired position, speed, and/or acceleration, and for maintaining it. The operation of stabilizing the aircraft obtained using the basic modes is performed quickly by the autopilot, whereas the operation of re-establishing position, speed, and/or acceleration of the rotary wing aircraft is performed subsequently and more slowly by the higher modes.

By way of example, Document WO 95/34029 describes a flight control system for an aircraft enabling the speeds of the aircraft to be stabilized by operating the controls relative to the yaw, roll, and pitching axes and also relative to lift, while maintaining a heading that is constant.

The autopilot can also provide advanced functions of assisting in the guidance of the rotary wing aircraft. The possibilities made available by the higher modes are also used to obtain such assistance. The ways in which advanced functions are executed depend on predefined capabilities of the autopilot relating to the setpoint track that is to be followed by the aircraft.

Specifically, such higher autopilot modes are designed to perform instrument flight rules (IFR) operations, i.e. for piloting that can be performed solely with the assistance of flight instruments and can thus be performed with degraded vision outside the aircraft, or indeed with no outside vision.

In contrast, visual flight rules (VFR) operations are performed when the pilot can control the aircraft by looking outside the aircraft and not only with the help of instruments and flight assistance.

By way of example, the setpoint track as used for a flight mission may be determined by the pilot of the rotary wing aircraft, or else during a stage of approaching a site that is known and identified. Such a site is provided in particular with means providing interactivity between the site and the autopilot, such as radio navigation beacons. In the absence of such interactive equipment, the site is identified by the pilot of the aircraft in manual mode, and then the pilot of the aircraft activates the desired advanced functions.

The operating capabilities of the autopilot make it possible to provide automatic piloting assistance by correcting the attitude of the rotary wing aircraft in cruising flight, at high speeds of advance, and when the aircraft is in a position that is remote from the ground. In a stage of cruising flight, the surroundings of the aircraft are normally empty and the pilot of the aircraft does not need to pay sustained attention to the maneuvering of the aircraft. The pilot can also avoid such sustained attention close to the ground in surroundings that are known by making use of an advanced function of the autopilot, such as during a stage of approaching a landing ground that is known and/or provided with means for identifying its surroundings.

Likewise, during a stage of approaching an intervention site that is known to the autopilot and that has been recognized and identified, activation of an advanced function is made possible, even at low speeds, for guiding the rotary wing aircraft along the corresponding setpoint track.

In addition, like a person piloting an aircraft, the autopilot conventionally controls the longitudinal, lateral, and vertical speeds of the aircraft respectively by the longitudinal cyclic pitch, the lateral cyclic pitch, and the collective pitch of the blades of the main rotor, and the collective pitch of the blades of an anti-torque rotor controlling the orientation of the aircraft about its yaw axis. These longitudinal, lateral, and vertical speeds are defined in a reference frame tied to the aircraft having axes that are formed by the longitudinal, lateral, and vertical directions of the aircraft.

The setpoint speed of advance for the autopilot can then be equal to the air speed or the ground speed of the aircraft depending on the stage of flight of the aircraft. Generally, ground speed is used as the setpoint speed of advance when flying at low altitude, i.e. when the aircraft is close to obstacles such as terrain in relief and buildings. Air speed is used as the setpoint speed of advance essentially during cruising flight at high altitude, i.e. when the aircraft is remote from any obstacle.

Nevertheless, in the event of the aircraft being subjected to a strong wind, e.g. a strong tail wind, using the ground speed as a setpoint for the speed of advance can become dangerous, in particular when the ground speed is low.

As a result, it can become problematic to determine the setpoint speed of advance depending on the flight conditions of the aircraft.

Furthermore, an autopilot can also enable the aircraft to perform coordinated turns. A coordinated turn is a turn performed without the aircraft drifting from the turn track relative to the ground, which is ground coordination, or else without any lateral load factor, which is air coordination.

With ground coordination, a turn is coordinated relative to the ground. The aircraft does not drift relative to the ground, thus enabling it to follow a ground track accurately. Such a turn that is coordinated relative to the ground is preferably used at low speed and low altitude so as to move safely in the proximity of terrain in relief or buildings, with the nose of the aircraft generally remaining in alignment with the ground track.

With air coordination, a turn is coordinated relative to the air. The aircraft does not drift relative to the air, thereby giving preference to the comfort of its occupants and minimizing the sideslip of the aircraft. Such a turn that is coordinated relative to the air is preferably used in cruising flight, i.e. at high speed and high altitude, and far away from any obstacles.

Document U.S. Pat. No. 5,213,283 describes a control system for performing a coordinated turn. That control system automatically supplies a yaw control signal in response to the pilot issuing a banking control signal while making such a coordinated turn, with the pilot's workload thus being reduced.

In addition, Document WO 2012/134447 describes a flight control system for an aircraft enabling a coordinated turn to be performed throughout the flight envelope, thereby minimizing the pilot's workload. At high speed, that control system makes use firstly of changes in the angle of attack of the aircraft to control heading and also lateral acceleration, and secondly of the air speed of the aircraft for controlling heading, so as to perform a coordinated turn relative to the air. At low speed, the control system makes use of the sideslip angle of the aircraft in order to maintain the heading in alignment with the track of the aircraft, thus performing a coordinated turn relative to the ground. In a transition zone between those two flight envelopes, the sideslip angle of the aircraft and its lateral acceleration are used to maintain the aircraft in a coordinated turn.

Furthermore, rotary wing aircraft are powered aircraft designed to be capable of flying in a variety of conditions that can sometimes be difficult, both in terms of atmospheric conditions, such as the presence of a strong wind and varying visibility conditions, and in terms of flight conditions, such as flying at low speeds or hovering, or indeed conditions involving the surroundings, such as being close to ground that is unknown or poorly known.

In difficult flight conditions, the pilot of the rotary wing aircraft is likely to need to take account of unexpected factors. It can then be awkward, or even impossible, for the pilot of the aircraft to make use of automatic assistance in maneuvering the aircraft under such difficult flying conditions. For example, when the aircraft is close to the ground, it must be possible for any change in its behavior to be implemented quickly. When the autopilot is using an advanced function implementing its higher modes of operation, it has difficulty in implementing a rapid modification to a track that is to be followed by the aircraft.

Under such difficult flying conditions, the use of IFR piloting can be dangerous and VFR piloting is to be preferred, but the pilot can nevertheless make use of assistance and/or certain instruments of the aircraft. Such conditions include in particular visual meteorological conditions (VMC) and degraded visual environment (DVE) conditions. The pilot may then find it necessary to make frequent adjustments to the speed and/or the track of the aircraft in order to avoid possible obstacles and in order to approach particular positions, e.g. if there is a strong side wind.

Document FR 2 777 535 describes a flight control system for an aircraft that makes it possible in particular to control lateral speed relative to the ground while maintaining a constant heading, e.g. for the purpose of compensating a strong side wind. That control system also makes it possible to maintain a constant direction for the speed of the aircraft, and thus for its track, while changing its heading and/or its longitudinal speed.

Furthermore, Document WO 2012/134460 describes a flight control system for an aircraft that makes it possible at a low speed to maintain a track that is constant relative to the ground while changing heading. The control system acts on the pitching and roll controls in order to maintain the track, with the pilot being able to cause the aircraft to move in rotation at any moment by means of those controls.

Likewise, Document WO 2012/096668 describes a flight control system for an aircraft that makes it possible to control the vertical speed of the aircraft, its pitch angle relative to the ground, and/or a height relative to the ground depending on its speed of advance. Below a predetermined speed of advance threshold, corresponding to a flight situation close to hovering, the flight control system makes it possible to maintain a height relative to the ground. Above that predetermined speed of advance threshold, the flight control system then enables a vertical speed of the aircraft to be maintained or else it enables a pitch angle relative to the ground to be maintained.

Furthermore, Document FR 2 814 433 describes a flight control device for an aircraft in which an action on a control member can have different effects depending on the speed in translation of the aircraft. Thus, if this speed in translation of the aircraft is less than or equal to a predetermined threshold, an action on the control member acts directly on the speed in translation. In contrast, if the speed in translation of the aircraft is greater than the predetermined threshold, then an action on the control member acts, by way of example, on the acceleration in translation of the aircraft, or indeed on its angular speed.

In addition, Document WO 2013/012408 describes a flight control system for an aircraft that makes it possible automatically for the aircraft to engage hovering flight starting from forward flight, and also enables a position to be maintained in hovering flight.

Finally, Document FR 2 741 855 describes a cyclic stick system for an aircraft having a device for recentering forces in order to ensure stability for the aircraft in speed of advance relative to the air. In particular, the anchor point of the cyclic stick is moved as a function of the speed of advance relative to air of the aircraft so as to counter any tendency for the speed of the aircraft to diverge.

BRIEF SUMMARY OF THE INVENTION

The present invention thus seeks to provide a method of determining the longitudinal air speed $V_{airX}$ and the longitudinal ground speed $V_{solX}$ of a rotary wing aircraft depending on the exposure of the aircraft to wind, and also to provide a system for determining this longitudinal air speed $V_{airX}$ and this longitudinal ground speed $V_{solX}$ depending on the exposure of the aircraft to the wind during a flight, while avoiding the above-mentioned limitations. The exposure of the aircraft to wind comprises firstly the total speed of the wind to which the aircraft is subjected and secondly the orientation of the aircraft relative to the wind direction.

According to the invention, a method of determining the longitudinal air speed $V_{airX}$ and the longitudinal ground speed $V_{solX}$ depending on the exposure of the aircraft to wind is for a rotary wing aircraft having at least one control means and an autopilot that generates control signals in compliance with predefined operating modes and in compliance with flight setpoints. By way of example, these control means may be control levers or sticks, pedals, or indeed control members known as "beeps" that enable the pilot of the aircraft to pilot the aircraft by transparency while the autopilot is in operation.

The aircraft is characterized by three preferred directions, a longitudinal direction X extending from the rear of the aircraft towards the front of the aircraft, an elevation direction Z extending upwards perpendicularly to the longitudinal direction X, and a transverse direction Y extending from right to left perpendicularly to the longitudinal and elevation directions X and Z.

The longitudinal direction X is the roll axis of the aircraft, the transverse direction Y is its pitching axis, and the elevation direction Z is its yaw axis.

The aircraft has at least one rotary wing provided with a plurality of main blades of pitch that is variable collectively and cyclically about respective pitch axes, enabling the aircraft to perform movements in rotation about those directions X, Y, Z and movements in translation along those directions X, Y, Z. The control signals from the autopilot can give rise to these movements of the aircraft in rotation and/or in translation relative to the directions X, Y, Z.

The aircraft generally follows a track $T_{sol}$ that is determined relative to the ground in order to reach a target on the ground, such as a landing ground. It is considered that the aircraft is following a track $T_{sol}$ when its center of gravity follows that track $T_{sol}$. The track $T_{sol}$ is defined in a terrestrial geographical reference frame, i.e. a reference frame that is stationary relative to the terrestrial globe, with the aircraft moving in that frame. By way of example, the terrestrial geographical reference frame may be based on cardinal points, e.g. the north and west directions, together with a vertical direction such as the direction of terrestrial gravity.

An aircraft flies along this track $T_{sol}$ at a speed of advance Va. The speed of advance Va of the aircraft is its speed along the direction of the track $T_{sol}$ and it may be determined relative to the ground to form a ground speed $V_{sol}$ and relative to the air to form an air speed $V_{air}$.

A flight of an aircraft along the track $T_{sol}$ is also characterized by a ground course angle $TK_{sol}$ measured relative to the north direction in a horizontal plane in the terrestrial geographical reference frame, a flight path angle P giving the angle of inclination of the track $T_{sol}$ relative to the horizontal plane in the terrestrial geographical reference frame, and a heading $\psi$.

The heading $\psi$ of the aircraft is the angle made between the north direction and the projection onto the horizontal plane of the terrestrial reference frame of the longitudinal direction X of the aircraft. Thus, when the heading $\psi$ and the ground course angle $TK_{sol}$ are equal, the nose of the aircraft points along the track $T_{sol}$. As a result, the longitudinal direction X is then in alignment with the track $T_{sol}$. Otherwise, the nose of the aircraft does not lie on the track $T_{sol}$ and the track $T_{sol}$ is not in alignment with the longitudinal direction X, it being understood that a rotary wing aircraft is capable in particular of advancing in any direction independently of its longitudinal direction X.

The method of determining the longitudinal air speed $V_{airX}$ and the longitudinal ground speed $V_{solX}$ of a rotary wing aircraft depending on the exposure to the wind of the aircraft is remarkable in that it comprises the following steps:

during a preliminary step, characteristic speed curves are determined for the aircraft in a coordinate system having the longitudinal ground speed $V_{solX}$ of the aircraft plotted up the ordinate axis and the longitudinal air speed $V_{airX}$ of the aircraft plotted along the abscissa axis, each characteristic speed curve being made up of operating points of the aircraft characterized by a longitudinal air speed $V_{airX}$ and a longitudinal ground speed $V_{solX}$;

during an initialization step, for the current stage of flight of the aircraft, an initial characteristic speed curve is identified on which the current operating point of the aircraft lies;

for this current stage of flight, and so long as the pilot does not cause an acceleration or a deceleration along the longitudinal direction of the aircraft, the longitudinal air and ground speeds $V_{airX}$ and $V_{solX}$ of the aircraft are controlled as a function of variation in the total speed of the wind on the longitudinal direction of the aircraft so that the current operating point of the aircraft moves on said initial characteristic speed curve; and after the pilot causes an acceleration or a deceleration of the aircraft along the longitudinal direction, a new characteristic speed curve is identified on which the current operating point of the aircraft lies once the longitudinal air and ground speeds $V_{airX}$ and $V_{solX}$ have stabilized and are substantially constant.

A rotary wing aircraft has at least one rotary wing with an axis of rotation that is substantially vertical, i.e. parallel to the elevation direction Z, and it may be built with a variety of architectures. By way of example, the aircraft may have a single rotary wing formed by a main rotor providing the aircraft with lift and propulsion, together with an anti-torque tail rotor having an axis of rotation that is substantially horizontal, i.e. parallel to the transverse direction Y. The anti-torque tail rotor also serves to perform maneuvers about the yaw axis.

In another example, the aircraft has two rotary wings formed by two contrarotating main rotors that may either be in tandem or else on the same axis. The aircraft may also have at least one rotary wing, such as a main rotor, providing the aircraft mainly with its lift, and one or more propulsive propellers having axes of rotation that are substantially horizontal, i.e. parallel to the longitudinal direction X and serving to provide the aircraft with propulsion. Such an aircraft then constitutes a hybrid helicopter.

Furthermore, a rotary wing aircraft may include aerodynamic elements such as stabilizers or wings, in particular in hybrid helicopters.

Whatever the architecture of the aircraft, the pilot of the aircraft can modify the behavior in flight of the aircraft by acting on one or more control means. By way of example, levers or indeed joysticks serve to vary the longitudinal and lateral cyclic pitch and/or the collective pitch of the main blades. Pedals serve to vary the collective pitch of the secondary blades of a tail rotor whereas a joystick can vary the collective pitch of the secondary blades of at least one propulsive propeller. Furthermore, if aerodynamic elements are present on the aircraft, the pilot of the aircraft may also cause their moving portions to move in order to modify the behavior in flight of the aircraft.

In addition, the autopilot can also modify the flight behavior of the aircraft by means of command signals that it supplies and in compliance with the flight setpoints, so as to vary the cyclic pitch and/or the collective pitch of the main blades, so as to vary the collective pitch of the secondary blades of a tail rotor or indeed of at least one propulsive propeller, and also so as to move movable portions of airfoil elements, if any are present.

In certain modes of operation of the autopilot, the pilot of the aircraft can intervene by transparency on the behavior of the aircraft by using control means, specifically control levers or sticks, pedals, or indeed beeps. The actions of the pilot by transparency then temporarily override the control signals generated by the autopilot in order to give rise to a change in at least one parameter of the track $T_{sol}$ followed by the aircraft. The flight setpoints for the autopilot may be modified and frozen on the new parameters for the track $T_{sol}$.

Thus, by way of example, the pilot may cause the aircraft to accelerate or decelerate along the longitudinal direction by acting on a lever for controlling variation in the longitudinal cyclic pitch of the blades of the main rotor of the aircraft, or else by acting on a beep.

During a flight, the aircraft flies with an air speed and a ground speed, with the difference between these two speeds being associated with the speed of the wind to which the aircraft is subjected. Furthermore, when the speed of the wind to which the aircraft is subjected is zero, the air speed and the ground speed are identical. The air speed or the ground speed may be used as a speed of advance setpoint for the autopilot depending on flight conditions and on the stage of flight being undertaken.

Nevertheless, the wind to which the aircraft is subjected, which wind is characterized by its direction relative to the aircraft, can have an influence on selecting this speed of advance setpoint for the autopilot.

The method of determining the longitudinal air speed $V_{airX}$ and the longitudinal ground speed $V_{solX}$ of an aircraft depending on the exposure to the wind of the aircraft makes it possible advantageously to take account of a variation in the longitudinal speed of the relative wind to which the aircraft is subjected during a stage of flight while the pilot is not causing any acceleration or deceleration of the aircraft along the longitudinal direction in order to determine the longitudinal air speed $V_{airX}$ and the longitudinal ground speed $V_{solX}$ corresponding to the current operating point of the aircraft, and consequently to apply a setpoint longitudinal speed of advance Vc to the autopilot that is equal to the longitudinal ground speed $V_{solX}$ or to the longitudinal air speed $V_{airX}$.

The term "longitudinal speed of the relative wind to which the aircraft is subjected" is used to mean a projection of the total speed of the relative wind to which the aircraft is subjected onto the longitudinal direction X. By convention, it is considered that a longitudinal speed of the relative wind to which the aircraft is subjected is negative when the aircraft is being subjected to a head wind and that such a longitudinal speed of the wind is positive when the aircraft is being subjected to a tail wind.

As a result, the longitudinal ground speed $V_{solX}$ of the aircraft is equal to the sum of the longitudinal air speed $V_{airX}$ plus the longitudinal speed of the relative wind to which the aircraft is subjected.

Furthermore, after the pilot has caused an acceleration or a deceleration of the aircraft along the longitudinal direction, this method also makes it possible to determine the longitudinal air speed $V_{airX}$ and the longitudinal ground speed $V_{solX}$ of the aircraft depending on the longitudinal speed of the relative wind to which the aircraft is subjected, and consequently to apply a new setpoint speed of advance to the autopilot of the aircraft. Specifically, each characteristic speed curve corresponds to a stage of flight of the aircraft.

The term "stage of flight" of the aircraft is used to mean a flight of the aircraft during which the pilot does not cause the aircraft to accelerate or decelerate along its longitudinal direction. As a result, during such a stage of flight, the aircraft can follow a track that is straight or a track that is curved and can perform turns that may be coordinated. Furthermore, such a stage of flight of the aircraft may be performed without changing the altitude of the aircraft.

A change in the stage of flight of the aircraft thus takes place only when the pilot causes the aircraft to accelerate or to decelerate along the longitudinal direction, e.g. by acting on a lever for controlling variation in the longitudinal cyclic pitch of the blades of the main rotor of the aircraft.

A new stage of flight is then reached when the acceleration or deceleration of the aircraft comes to an end, i.e. once its longitudinal air speed $V_{airX}$ and its longitudinal ground speed $V_{solX}$ have stabilized and become constant.

After causing the aircraft to accelerate or decelerate along the longitudinal direction and thus changing the stage of flight of the aircraft, the current operating point of the aircraft has changed and is to be found on a new characteristic speed curve.

Such characteristic speed curves for the aircraft can be determined experimentally, as a result of test flights performed using the aircraft, which test flights then cover the major part of the flight envelope. Nevertheless, such characteristic speed curves for the aircraft can also be determined theoretically by calculation and can then be possibly corrected and refined by performing test flights, in which case the test flights can be limited.

These characteristic speed curves may be defined arithmetically by one or more mathematical relationships. The characteristic speed curves may also be defined by tables of values for longitudinal air speed $V_{airX}$ and longitudinal ground speed $V_{solX}$, e.g. obtained during test flights.

In addition, at low ground speeds that correspond in general to flight at low altitude and close to obstacles, the setpoint speed of advance for the autopilot of the aircraft is substantially equal to the ground speed. For a first range of speeds corresponding to low ground speeds, the characteristic speed curves are constituted in full or in part by substantially horizontal straight lines. The method of the invention thus tends to preserve the ground speed of the aircraft at low ground speeds. The term "preserve a speed" is used to mean keep it constant.

Likewise, for high air speeds that correspond in general to cruising flight at high altitude far away from any obstacle, the speed of advance setpoint for the autopilot of the aircraft is substantially equal to the air speed. For a second range of speeds corresponding to high air speeds, the characteristic speed curves are constituted in full or in part by straight lines that are substantially vertical. The method of the invention thus tends to preserve the air speed of the aircraft at high air speeds.

For a longitudinal air speed $V_{airX}$ greater than a maximum longitudinal air speed $V_{airXMax}$, the characteristic speed curves for the aircraft are strictly vertical lines corresponding respectively to a constant longitudinal air speed $V_{airX}$ independent of the longitudinal wind speed and of the longitudinal ground speed $V_{solX}$. This maximum longitudinal air speed $V_{airXMax}$ may for example be equal to 120 knots (120 kt).

Furthermore, between these first and second speed ranges, the method of the aircraft provides a progressive and balanced transition between preserving the ground speed $V_{sol}$ of the aircraft and preserving its air speed $V_{air}$.

In addition, these characteristic speed curves also show how maintaining a ground speed $V_{sol}$ at low speeds of advance changes over progressively towards maintaining an air speed $V_{air}$ at high speeds of advance.

Each characteristic speed curve is generally constituted by a horizontal first segment corresponding to a constant longitudinal ground speed $V_{solX}$, then by a circular arc, and then by a vertical second segment corresponding to a constant longitudinal air speed $V_{airX}$.

The transition between the longitudinal ground speed $V_{solX}$ and the longitudinal air speed $V_{airX}$ used as the setpoint longitudinal speed of advance Vc for application to the autopilot takes place when the operating point of the aircraft is located on a transition point situated on the circular arc of a characteristic speed curve. Consequently, when the operating point is situated on the first segment or on a first portion of the circular arc situated between the first segment and the transition point of the circular arc, the longitudinal speed of advance setpoint Vc for the autopilot is equal to the longitudinal ground speed $V_{solX}$ of the operating point.

Likewise, when the operating point is situated on the second segment or on a second portion of the circular arc situated between the transition point of the circular arc and the second segment, the longitudinal speed of advance setpoint Vc of the autopilot is equal to the longitudinal air speed $V_{airX}$ of the operating point.

Preferably, the transition point is situated in the middle of the circular arc in each characteristic speed curve.

When the current operating point lies on the circular arc connecting together the first and second segments of the characteristic speed curve, the longitudinal ground speed $V_{solX}$ and the longitudinal air speed $V_{airX}$ can vary simultaneously in opposite directions in the event of the longitudinal speed of the wind varying.

For example, the longitudinal ground speed $V_{solX}$ increases as a result in an increase in the longitudinal speed of the wind to which the aircraft is subjected while the longitudinal air speed $V_{airX}$ decreases simultaneously.

In contrast, when the longitudinal air speed $V_{airX}$ is greater than the maximum longitudinal air speed $V_{airXMax}$, the operating point is situated on a vertical line corresponding to a constant longitudinal air speed $V_{airX}$, as mentioned above. The longitudinal speed of advance setpoint Vc for the autopilot of the aircraft is then equal to this longitudinal air speed $V_{airX}$ regardless of the exposure of the aircraft to the wind, and thus independently of the longitudinal speed of the wind to which the aircraft is subjected. The method of the invention then consists in stabilizing the air speed regardless of the longitudinal wind conditions to which the aircraft is subjected. Advantageously, the method of the invention thus makes it possible to use the aircraft at constant power, close to its maximum power for longitudinal air speeds $V_{airX}$ that are greater than the maximum longitudinal air speed $V_{airXmax}$.

Furthermore, during a flight, the aircraft being subjected to a strong tail wind may be associated with the aircraft decelerating to air speeds that are low, in order to maintain a longitudinal ground speed $V_{solX}$ that is constant, or at least in order to avoid the aircraft accelerating excessively relative to the ground. Such a maneuver can be dangerous for any aircraft, and in particular for a rotary wing aircraft. Specifically, the aircraft is then moving in a mass of air that has been churned by its main rotor, and there is a risk of this churned mass of air that is caused to move downwards by a swirling effect ending up producing insufficient lift to ensure that the aircraft continues to be maneuverable or even to be sustained in the air. This dangerous situation is referred to by terms such as "vortex ring state" and "settling with power", where the second term means that applying additional power to the main rotor does not stop the aircraft descending.

In order to avoid such a situation, the longitudinal air speed $V_{airX}$ needs to be greater than or equal to a minimum longitudinal air speed $V_{airXMin}$. As a result, no characteristic speed curve for the aircraft is used at a longitudinal air speed $V_{airX}$ that is less than the minimum longitudinal air speed $V_{airXMin}$.

This minimum longitudinal air speed $V_{airXMin}$ may for example be constant and equal to 30 knots (30 kt).

This minimum longitudinal air speed $V_{airXMin}$ may also depend on the wind to which the aircraft is subjected, and in particular it may depend on the modulus (i.e. the magnitude) of the total speed of this wind.

For example, for total wind speeds having moduli greater than or equal to 40 kt, this minimum longitudinal air speed $V_{airXMin}$ is equal to 30 kt. As a result, this minimum longitudinal air speed $V_{airXmin}$ decreases linearly with a decrease in the modulus of the total wind speed down to 0 kt for moduli less than or equal to 10 kt. Specifically, the above-mentioned maneuver is less dangerous with low wind since a low tail wind has less tendency to accelerate the aircraft, and consequently there is less need to decelerate the aircraft in order to maintain a constant longitudinal ground speed $V_{solX}$.

Advantageously, the method of the invention makes use of the total speed of the wind to which the aircraft is subjected and not only its longitudinal projection. Thus, regardless of the exposure of the aircraft to the wind, the minimum longitudinal air speed $V_{airXMin}$ is defined so as to anticipate a potential change in heading of the aircraft so as to take up a pure tail wind position.

The minimum longitudinal air speed $V_{airXMin}$ thus constitutes a limit on the operational range of longitudinal speeds of the aircraft for application of characteristic speed curves of the aircraft. A minimum longitudinal ground speed $V_{solXMin}$ also constitutes a limit of the operational range of longitudinal speeds.

Furthermore, the longitudinal speed of the wind to which the aircraft is subjected may vary as a result of a change in the direction of the wind in the terrestrial reference frame, e.g. relative to north, or else to a change in its modulus. This variation in the longitudinal speed of the wind to which the aircraft is subjected may also result from a change in the orientation of the aircraft relative to the wind caused by the aircraft turning or by a change in the heading $\psi$ of the aircraft, with the aircraft nevertheless remaining in the same stage of flight. The purpose of such a change of heading $\psi$ may be to improve the pilot's visibility of the surroundings of the aircraft, in particular during low altitude flight, and it may be performed without changing the track of the aircraft $T_{sol}$.

The autopilot may make such a turn or such a change in heading $\psi$ in order to follow a predetermined track $T_{sol}$. Such a turn may also be made by an action of the pilot by transparency, and the same applies to changing heading $\psi$. By way of example, such an action by transparency may be performed by using first control means controlling the lateral cyclic pitch of the main blades of the main rotor of the aircraft, such as a cyclic pitch stick, commonly referred to as a "cyclic stick", or by using a roll beep.

Furthermore, the pilot of the aircraft may also act by transparency on the speed of advance of the aircraft by acting on control means for the longitudinal direction by controlling the longitudinal cyclic pitch of the main blades of the main rotor of the aircraft, such as a cyclic stick or indeed a pitching beep. The aircraft pilot may also act in the longitudinal direction by transparency on the speed of advance by using control means that control the pitch of propulsive propellers on a hybrid helicopter.

This action of the pilot on the speed of advance of the aircraft leads to the aircraft accelerating or decelerating, thereby changing the speed of advance without changing the track $T_{sol}$ of the aircraft, and consequently changing the flight stage of the aircraft. Consequently, the previously-identified initial characteristic speed curve is no longer valid, since the new operating point of the aircraft as a result of this change in its speed of advance no longer lies on the initial characteristic speed curve. A new characteristic speed curve then needs to be identified as a function of the new operating point and the new stage of flight of the aircraft.

For example, if the speed of advance setpoint for the autopilot is equal to the longitudinal ground speed $V_{solX}$ and if the pilot's action leads to the aircraft accelerating, and consequently to an increase in this setpoint speed of advance, the longitudinal ground speed $V_{solX}$ is increased, as is the longitudinal air speed $V_{airX}$. As a result, the longitudinal speed of the relative wind to which the aircraft is subjected is also modified. The new operating point, corresponding to these increased longitudinal ground and air speeds $V_{solX}$ and $V_{airX}$ then makes it possible to identify the new characteristic speed curve on which the new operating point is located, and thus to identify the new longitudinal speed of the relative wind to which the aircraft is subjected.

Likewise, if the speed of advance setpoint for the autopilot is equal to the longitudinal air speed $V_{airX}$ and if the pilot's action leads to an acceleration of the aircraft and consequently to an increase in the speed of advance setpoint, then the longitudinal air speed $V_{airX}$ is increased, as is the longitudinal ground speed $V_{solX}$. As a result, the longitudinal speed of the relative wind to which the aircraft is subjected is also modified. The new operating point, corresponding to these increased longitudinal air and ground speeds $V_{airX}$ and $V_{solX}$ then makes it possible to identify new characteristic speed curve and the new longitudinal speed of the relative wind to which the aircraft is subjected.

Thus, a change in the characteristic speed curve follows on from the pilot causing the aircraft to accelerate or decelerate along its longitudinal direction, e.g. by taking longitudinal action on the cyclic stick of the aircraft or indeed on a pitching beep.

In contrast, the operating point remains on a characteristic speed curve so long as the pilot does not cause the aircraft to accelerate or decelerate along its longitudinal direction, with the pilot then not acting longitudinally on the cyclic stick of the aircraft or on a pitching beep.

In addition, as mentioned above, the operating point also remains on the same characteristic speed curve as a result of the pilot causing the aircraft to accelerate or decelerate along the lateral direction, e.g. by taking lateral action on the cyclic pitch or on the roll beep.

Furthermore, reaching the limits of the operational range can lead to a change in the characteristic speed curves while still complying with the minimum longitudinal air or ground speed constraints. For example, when the longitudinal air speed $V_{airX}$ is equal to the minimum longitudinal air speed $V_{airXMin}$ and the longitudinal speed of the wind decreases, then at each instant a new characteristic speed curve is determined on the basis of the current operating point. Specifically, since the minimum longitudinal air speed $V_{airXmin}$ has been reached, the longitudinal air speed $V_{airX}$ can no longer be reduced. The longitudinal ground speed $V_{solX}$ must then be increased and a new characteristic speed curve is then frozen once the wind conditions make it possible to remain on this characteristic speed curve while complying with the constraints on the minimum longitudinal air speed $V_{airXMin}$.

In contrast, under such circumstances, in order to avoid changing characteristic speed curves at the slightest fluctuation in the longitudinal speed of the wind to which the aircraft is subjected, it is possible to take a protective threshold into account.

For example, it is necessary for the difference between firstly the sum of the longitudinal speed of the wind plus the minimum longitudinal air speed $V_{airXmin}$ and secondly the longitudinal ground speed $V_{solX}$ specified by the initial characteristic speed curve to be greater than this protective threshold while the aircraft is flying with a longitudinal air speed $V_{airX}$ equal to the minimum longitudinal air speed $V_{airXMin}$ in order to change the characteristic speed curve.

Furthermore, the longitudinal air speed $V_{airX}$ that is equal to the minimum value $V_{airXMin}$ is substantially constant, as is the longitudinal ground speed $V_{solX}$ that is specified by the initial characteristic speed curve. Consequently, it is also possible, more simply, to compare variation in the longitudinal speed of the wind with a protective threshold, such that a variation in the longitudinal speed of the wind that is greater than the protective threshold determines when it is necessary to change the initial characteristic speed curve.

Using this protective threshold can be replaced by using a threshold having hysteresis concerning this difference between firstly the sum of the longitudinal speed of the wind plus the minimum longitudinal air speed $V_{airXMin}$, and secondly the longitudinal ground speed $V_{solX}$ specified by the characteristic speed curve. A threshold with hysteresis can also be applied solely to variation in the longitudinal speed of the wind.

The term "threshold with hysteresis" specifies a set of two thresholds for which the setpoint for activating a system is different from its setpoint for stopping it. Such a threshold with hysteresis is made up of high and low thresholds that are different. The presence of these two thresholds serves essentially to avoid too many consecutive activations and stops. In order to update the characteristic speed curve for the method of the invention, a high threshold $V_{thres1}$ is applied to the difference between firstly the sum of the longitudinal speed of the wind plus the minimum longitudinal air speed $V_{airXMin}$ and secondly the longitudinal ground speed $V_{solX}$ as specified by the initial characteristic speed curve. This longitudinal ground speed $V_{solX}$ specified by the initial characteristic speed curve is then considered as a longitudinal ground speed reference, so long as a new characteristic speed curve has not been frozen.

Once this difference is greater than the high threshold $V_{thres1}$, the characteristic speed curve in use is changed when the longitudinal speed of the wind increases, and consequently the longitudinal ground speed $V_{solX}$ also increases. The change in characteristic speed curves is suspended on the longitudinal ground speed $V_{solX}$ becoming constant or decreasing.

A low threshold $V_{thres2}$ is then applied to the same difference between firstly the sum of the longitudinal speed of the wind plus the minimum longitudinal air speed $V_{airXMin}$ and secondly the longitudinal ground speed $V_{solX}$ as specified by a new characteristic speed curve. Once the second difference becomes less than the low threshold $V_{thres2}$, then the new characteristic speed curve is frozen.

For example, the high threshold $V_{thres1}$ is equal to 3 kt and the low threshold $V_{thres2}$ is equal to 1 kt.

Furthermore, a pilot's action seeking to slow down the aircraft has priority over the minimum limits of this operating range. Specifically, a pilot's action has priority over these minimum limits so that the method of the invention does not impede the pilot's intention.

If the pilot voluntarily slows down the aircraft to a longitudinal air speed slower than the minimum longitudinal air speed $V_{airXMin}$, a new minimum longitudinal air speed $V_{airXMin2}$ is then defined. This new minimum longitudinal air speed $V_{airXMin2}$ is smaller than the longitudinal air speed $V_{airX}$ selected by the pilot by some predetermined value $V_\delta$, typically 10 kt, and it replaces the initial minimum longitudinal air speed $V_{airXMin}$ until the longitudinal air speed $V_{airX}$ exceeds the initial minimum longitudinal air speed $V_{airXMin}$ by a value equal to the same predetermined value $V_\delta$, typically 10 kt.

In contrast, if the pilot voluntarily slows down the aircraft to a longitudinal ground speed less than the minimum longitudinal ground speed $V_{solXMin}$, then the method of determining the longitudinal air speed $V_{airX}$ and the longitudinal ground speed $V_{solX}$ of an aircraft is reduced purely to maintaining the longitudinal ground speed $V_{solX}$ and no characteristic speed curve is used. The method of the invention then enables the aircraft to be piloted, e.g. while purely maintaining the longitudinal ground speed $V_{solX}$ in compliance with the controls issued by the pilot.

Thereafter, determining the longitudinal air speed $V_{airX}$ and the longitudinal ground speed $V_{solX}$ of the aircraft using the method of the invention becomes effective once more when the current longitudinal ground speed $V_{solX}$ of the aircraft is greater than the minimum longitudinal ground speed $V_{solXMin}$.

In addition, in a particular mode of operation of the autopilot, the aircraft may be made to fly with heading correction in association with each lateral movement, in compliance with the generic term "coordinated turn", or else while maintaining heading, along the ground speed of the aircraft. When flying with coordinated turns, the flight setpoint for the autopilot are a ground course angle $TK_{sol}$, the speed of advance Va, a flight path angle P, and a small lateral speed component. In order to keep this lateral speed small in spite of a lateral movement command, the heading $\psi$ needs to vary continuously.

Conversely, for flight while maintaining heading, these flight setpoints are a longitudinal ground speed $V_{solX}$, a lateral ground speed $V_{solY}$, a vertical speed $W_Z$, and the heading $\psi$ which usually remains constant.

Furthermore, in this particular mode of operation of the autopilot, the pilot of the aircraft can act directly by transparency on these flight setpoints by acting on one or more control means such as sticks or beeps both while maintaining heading and during a coordinated turn. Preferably, heading is maintained close to a stage of hovering flight and thus for speeds of advance that are small, at low altitudes, while turns are coordinated for faster speeds of advance, such as during cruising flight.

Furthermore, an action of the pilot of the aircraft by transparency leading to a turn being made needs to be accompanied by the turn being coordinated down to low speeds, but not while hovering, where a pilot expects rather heading that is maintained. As a result, a transition is necessary between a "coordinated turn" stage and a "heading maintained" stage. Furthermore, this transition must be performed that much more quickly if the head wind is strong, since it is preferable to maintain a stable head wind and to perform a lateral maneuver under strong wind conditions. During deceleration of the aircraft without lateral movement, turn coordination maintains heading. The transition between a "coordinated turn" stage and a "heading maintained" stage can then occur in a manner that is completely imperceptible for the pilot. It is therefore desirable for this transition to be made clear in order to assist the pilot in understanding the ways in which autopilot controls are changing, e.g. in the form of a symbol representing the heading reference, often referred to as a "bug", that appears on the heading scale, or a change in shape for the ground speed setpoint.

The transition from coordinated turning to maintaining heading is not troublesome for the pilot of the aircraft in straight line flight, whereas it can be troublesome when turning. Such a changeover from coordinated turning to maintaining heading while the pilot has banked the aircraft in roll would lead to a rapid, disagreeable, and unexpected increase in the lateral load factor that could go so far as to disorient the pilot. The method of the invention for determining longitudinal air speed and longitudinal ground speed must therefore avoid leading to a change being made between coordinated turning and maintaining heading at a moment when the pilot is not expecting it.

Specifically, the method of the invention enables the longitudinal ground speed $V_{solX}$ to be kept greater than or equal to the minimum longitudinal ground speed $V_{solXMin}$ in order to avoid this changeover from coordinated turning to maintaining heading. This minimum longitudinal ground speed $V_{solXMin}$ is greater than or equal to a threshold speed for changing over between maintaining heading and coordinated turning. Preferably, this minimum longitudinal ground speed $V_{solXMin}$ is strictly greater than the threshold speed for changing over between maintaining heading and coordinated turning, with the difference between the minimum longitudinal ground speed $V_{solXMin}$ and the threshold speed for changeover between maintaining heading and coordinated turning being 4 knots (4 kt), for example.

This risk exists mainly when the aircraft is subjected to a head wind of increasing strength or when the aircraft is turning so as to bring its heading so that it faces into the direction from which the wind is coming. Consequently, as soon as the longitudinal speed of the relative wind to which the aircraft is subjected indicates a head wind of sufficient strength, the method of the invention defines a forward speed setpoint such that the longitudinal ground speed $V_{solX}$ is kept greater than or equal to the minimum longitudinal ground speed $V_{solXMin}$.

Furthermore, when the aircraft is flying with a longitudinal ground speed $V_{solX}$ that is equal to the minimum longitudinal ground speed $V_{solXMin}$ and the aircraft is subjected to a head wind of increasing strength or indeed when the aircraft turns so as to bring its heading into the direction from which the wind is coming, the method of the invention maintains the longitudinal ground speed $V_{solX}$ constant and gives rise to an increase in the longitudinal air speed $V_{airX}$. Consequently, the characteristic speed curve is changed for a new characteristic speed curve corresponding to the longitudinal ground speed $V_{solX}$ equal to the minimum longitudinal ground speed $V_{solXMin}$ and to the new longitudinal air speed $V_{airX}$.

Once more, in order to avoid changing the characteristic speed curves at the slightest fluctuation in the longitudinal speed of the head wind to which the aircraft is subjected, a protective threshold should be taken into account.

For example, for this characteristic speed curve to be changed, it is necessary for the difference between firstly the minimum longitudinal ground speed $V_{solXMin}$ minus the longitudinal speed of the wind and secondly the longitudinal air speed $V_{airX}$ specified by the initial characteristic speed curve to be greater than this protective threshold while the aircraft is flying at a longitudinal air speed $V_{airX}$ equal to the minimum longitudinal air speed $V_{airXMin}$.

Furthermore, the longitudinal ground speed $V_{solX}$ that is equal to the minimum value $V_{solXMin}$ is substantially constant as is the longitudinal air speed $V_{airX}$ that is specified by the initial characteristic speed curve. Consequently, it is possible more simply to compare variation in the longitudinal speed of the wind with a protective threshold, a variation in the longitudinal speed of the wind greater than the protective threshold indicating that the initial characteristic speed curve needs to be changed.

As mentioned above, the use of this protective threshold may be replaced by using a threshold with hysteresis on this difference between firstly the sum of the longitudinal speed of the wind and the minimum longitudinal air speed $V_{airXMin}$ and secondly the longitudinal ground speed $V_{solX}$ specified by the characteristic speed curve. A threshold with hysteresis may also be applied solely to the variation in the longitudinal speed of the wind.

The present invention also provides a system for determining the longitudinal air speed $V_{airX}$ and the longitudinal ground speed $V_{solX}$ of a rotary wing aircraft depending on the exposure of the aircraft to the wind, the aircraft flying on a track $T_{sol}$ relative to the ground at a speed of advance Va, it being possible for the speed of advance Va to be determined relative to the ground in order to form a ground speed $V_{sol}$ and relative to the air in order to form an air speed $V_{air}$. The system for determining the longitudinal air speed $V_{airX}$ and the longitudinal ground speed $V_{solX}$ includes at least one computer and at least one memory.

The rotary wing aircraft is also provided with at least one control means and with an autopilot for generating control signals in predefined modes of operation and in compliance with flight setpoints. By way of example, these control means may be control sticks or levers and pedals, or indeed control members such as "beeps" that enable the pilot of the aircraft to pilot the aircraft by transparency during operation of the autopilot.

The system for determining the longitudinal air speed $V_{airX}$ and the longitudinal ground speed $V_{solX}$ can thus perform the above-described method for determining the longitudinal air speed $V_{airX}$ and the longitudinal ground speed $V_{solX}$.

A computer uses the set of characteristic speed curves for the aircraft stored in at least one memory of the system. The computer can determine which characteristic speed curve corresponds to the stabilized stage of flight of the aircraft, and consequently it can determine the longitudinal air speed $V_{airX}$ and the longitudinal ground speed $V_{solX}$ and also the speed of advance setpoint that is to be used by the autopilot depending on the exposure of the aircraft to the wind.

BRIEF DESCRIPTION OF THE SEVERAL VIEWS OF THE DRAWINGS

The invention and its advantages appear in greater detail from the context of the following description of embodiments given by way of illustration and with reference to the accompanying figures, in which:

FIGS. 4 and 5 are two graphs plotting characteristic speed curves for a rotary wing aircraft.

DETAILED DESCRIPTION OF THE INVENTION

Elements present in more than one of the figures are given the same references in each of them.

Figure 1:
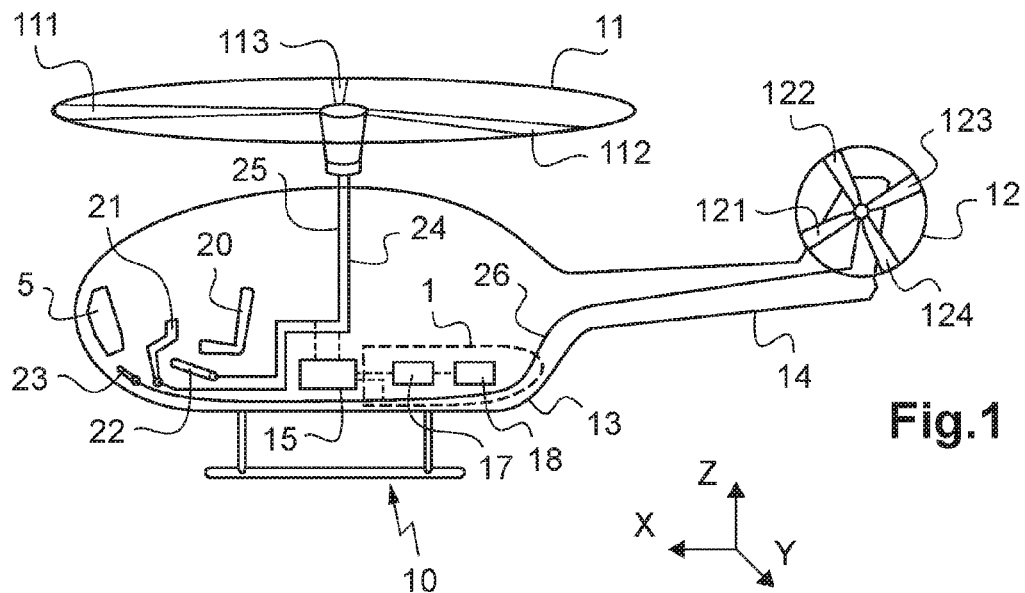
FIG. 1 shows an aircraft fitted with a system of the invention for determining longitudinal air speed $V_{airX}$ and longitudinal ground speed $V_{solX}$.

In FIG. 1 there can be seen an aircraft 10 that has a main rotor 11 positioned above a fuselage 13 and an anti-torque device 12 such as a tail rotor positioned at the tail end of a tail boom 14. The aircraft 10 also has an instrument panel 5, a seat 20 on which the pilot of the aircraft 10 can sit, an autopilot 15, a system 1 for determining the air speed $V_{air}$ and the ground speed $V_{sol}$ of a rotary wing aircraft 10 depending on the wind exposure of the aircraft 10, and manual control means, made up in particular of two levers or control sticks 21, 22 and pedals 23. The system 1 for determining the air speed $V_{air}$ and the ground speed $V_{sol}$ of an aircraft 10 comprises a computer 17, together with a memory 18.

Furthermore, an X, Y, Z reference frame is attached to the aircraft 10, and more particularly to its center of gravity. The longitudinal direction X extends from the rear of the aircraft 10 to the front of the aircraft 10, the elevation direction Z extends upwards perpendicularly to the longitudinal direction X, and the transverse direction Y extends from right to left perpendicularly to the longitudinal and elevation directions X and Z.

The longitudinal direction X is the roll axis of the aircraft 10, the transverse direction Y is its pitching axis, and the elevation direction Z is its yaw axis.

The main rotor 11 has an axis of rotation that is substantially vertical, i.e. parallel to the elevation direction Z, and it is provided with three main blades 111, 112, 113 having collective pitch and cyclic pitch that are variable under the control of the control sticks 21, 22 and of the autopilot 15. In similar manner, the tail rotor 12 has its axis of rotation that is substantially horizontal, i.e. parallel to the transverse direction Y, and it is provided with four secondary blades 121, 122, 123, 124 of collective pitch that is variable and controllable by means of the pedals 23 and of the autopilot 15.

More precisely, the first control stick 21 controls the cyclic pitch of the main blades 111, 112, 113 by means of a first control linkage 24. The second control stick 22 controls the collective pitch of the main blades 111, 112, 113 by means of a second control linkage 25. Taking action on the first control stick 21 then serves to control movements in rotation of the aircraft 10 about the longitudinal and transverse directions X and Y, and taking action on the second control stick then serves to control movements in translation of the aircraft 10 along the elevation direction Z.

Likewise, the pedals 23 control the collective pitch of the secondary blades 121, 122, 123, 124 via a third control linkage 26. Taking action on the pedals 23 then serves to control movements in rotation of the aircraft 10 about its yaw axis.

The control linkages 24, 25, 26 serve to actuate the various blades and may for example be made up of connections that are entirely mechanical between the manual control means 21, 22, 23 and the blades. These control linkages 24, 25, 26 may also be made up of mechanical connections associated with hydraulic actuator means, or indeed electrical connections associated with such hydraulic actuator means.

The autopilot 15 also serves to control the collective and cyclic pitches of the main blades 111, 112, 113, and also the collective pitch of the secondary blades 121, 122, 123, 124 by acting respectively on the same control linkages 24, 25, 26. The autopilot 15 then serves to control movements in rotation of the aircraft 10 about the longitudinal and transverse directions X and Y and movements in translation of the aircraft 10 along the elevation direction Z, and also movements in rotation of the aircraft 10 about its yaw axis.

The aircraft 10 can fly along a track $T_{sol}$ relative to the ground, this track $T_{sol}$ being determined relative to the ground and defined in a terrestrial geographical reference frame, e.g. determined by the cardinal points and the direction of terrestrial gravity.

In certain modes of operation of the autopilot 15, the pilot of the aircraft 10 can act transparently on the behavior of the aircraft 10 via the control means 21, 22, 23 and via beeps (not shown in FIG. 1). The actions of the pilot by transparency then temporarily override the control orders generated by the autopilot 15 in order to give rise to a change of at least one parameter of the track $T_{sol}$ followed by the aircraft 10. The flight setpoints of the autopilot 15 may be modified and frozen on the new parameters for the track $T_{sol}$.

A flight of an aircraft 10 along this track $T_{sol}$ may particularly be characterized by a ground course angle $TK_{sol}$ between the direction of the track $T_{sol}$ and the direction of north in a horizontal plane of the terrestrial geographical reference frame, a speed of advance Va of the aircraft 10, a flight path angle P formed by the angle between the direction of the track $T_{sol}$ and the horizontal orientation of the terrestrial reference frame, and a heading $\psi$, which is the angle formed between the direction of north and the projection of the longitudinal direction X of the aircraft 10 onto a horizontal plane of the terrestrial reference frame.

The speed of advance Va of the aircraft 10 is the speed of the aircraft 10 along the direction of the track $T_{sol}$, and this speed may be defined relative to the ground to form a ground speed $V_{sol}$ or else relative to the air to form an air speed $V_{air}$.

Figure 2:
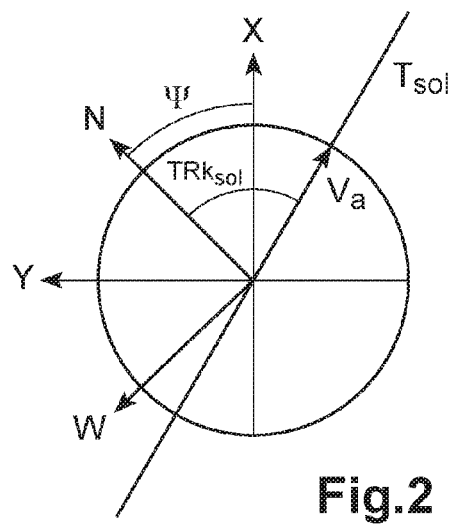
FIG. 2 is a diagram showing the ground route angle and the heading of the aircraft.

FIG. 2 shows a projection onto a horizontal plane of the terrestrial reference frame of a track $T_{sol}$. The longitudinal and transverse directions X, Y of the aircraft 10 are also shown as are the directions N, W of a terrestrial geographical reference frame.

The heading $\psi$ is thus shown between the longitudinal direction X of the aircraft 10 and the direction N of north. The course angle $TK_{sol}$ on the ground is shown between the direction of the track $T_{sol}$ and the direction N of north.

It can be seen that the heading $\psi$ is different from the ground course angle $TK_{sol}$. Consequently, the nose and the tail boom 14 of the aircraft 10, which are in alignment on the longitudinal direction X, are not in alignment with the track $T_{sol}$. Likewise, the speed of advance Va is in alignment with the track $T_{sol}$ and is not parallel to the longitudinal direction X.

Figure 3:
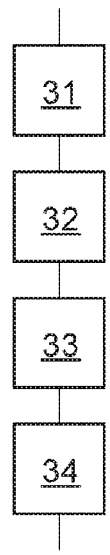
FIG. 3 is a block diagram of a method for determining longitudinal air speed $V_{airX}$ and longitudinal ground speed $V_{solX}$.

The system 1 for determining the air speed $V_{air}$ and the ground speed $V_{sol}$ of a rotary wing aircraft 10 depending on the exposure to the wind of the aircraft 10 is capable of performing the method of determining this air speed $V_{air}$ and this ground speed $V_{sol}$ as shown in summary in FIG. 3.

FIG. 4 is a graph plotting characteristic speed curves of the aircraft 10. In the graph, the abscissa axis represents the longitudinal air speed $V_{airX}$ of the aircraft 10 and the ordinate axis represents its longitudinal ground speed $V_{solX}$. The scales are graduated identically along these abscissa and ordinate axes. These characteristic speed curves of the aircraft 10 enable the longitudinal air speed $V_{airX}$ and the longitudinal ground speed $V_{solX}$ of the aircraft 10 to be determined as a function of the exposure of the aircraft 10 to the wind and in particular as a function of the longitudinal speed of the relative wind to which the aircraft 10 is subjected.

Each characteristic speed curve is constituted by operating points of the aircraft 10 in flight and corresponds to a stage of flight of the aircraft 10. Each operating point is characterized by a longitudinal air speed $V_{airX}$ and a longitudinal ground speed $V_{solX}$ of the aircraft. Each operating point may be found only on a single characteristic speed curve.

In this graph, it can be seen that for high longitudinal air speeds $V_{airX}$ greater than a maximum longitudinal air speed $V_{airXMax}$, the characteristic speed curves of the aircraft 10 are vertical straight lines corresponding respectively to constant longitudinal air speeds $V_{airX}$. Likewise, in this graph it can be seen that the characteristic speed curves are shown for longitudinal air speeds $V_{airX}$ greater than or equal to a minimum longitudinal air speed $V_{airXMin}$.

In addition, a minimum longitudinal ground speed $V_{solXMin}$ constituting a lower limit for the longitudinal ground speed $V_{solX}$ is also shown in FIG. 4.

For longitudinal air speeds $V_{airX}$ lying between the minimum longitudinal air speed $V_{airXMin}$ and the maximum longitudinal air speed $V_{airXMax}$, a characteristic speed curve for the aircraft 10 is constituted by a horizontal segment and a vertical segment that are connected together by a circular arc. The horizontal segment corresponds to a constant longitudinal ground speed $V_{solX}$ and the vertical segment corresponds to a constant longitudinal air speed $V_{airX}$.

This graph also has parallel wind lines corresponding respectively to a longitudinal speed for the relative wind to which the aircraft 10 is being subjected. The wind line Dv0 represents situations in which the longitudinal wind speed to which the aircraft 10 is subjected is zero, whereas the wind lines Dv−60, Dv−40, Dv+40, and Dv+60 correspond respectively to longitudinal wind speeds of −60 knots (−60 kt), −40 knots (−40 kt), +40 knots (+40 kt), and +60 knots (+60 kt). Each wind line intersects once only with a characteristic wind curve associating an operating point of the aircraft 10 with a longitudinal speed of the wind to which the aircraft 10 is subjected.

The longitudinal wind speeds that are negative represent head winds to which the aircraft 10 is subjected, whereas those that are positive represent tail winds to which the aircraft 10 is subjected. In order to make FIG. 4 more readable, the characteristic speed curves are shown for a range of longitudinal wind speeds going from −60 kt to +60 kt. Nevertheless, the characteristic wind curves may be extended for other longitudinal speeds for the relative wind to which the aircraft 10 is subjected.

During a preliminary step 31 of the method of determining the wind speed $V_{air}$ and the ground speed $V_{sol}$ of the aircraft, characteristic wind curves are determined for the aircraft 10 as shown in FIG. 4. These characteristic wind curves for the aircraft 10 are determined experimentally, as a result of test flights performed by the aircraft 10, or else they are determined theoretically. The computer 17 uses all of these characteristic wind curves for the aircraft 10, which are stored in the memory 18 so as to be usable for each flight of the aircraft 10.

Thereafter, during an initialization step 32, during a stage of flight of the aircraft 10, the computer 17 acts as a function both of the longitudinal air speed $V_{airX}$ and of the longitudinal ground speed $V_{solX}$ of the aircraft 10 to identify the characteristic wind speed that corresponds to this stage of flight, which then becomes the initial characteristic wind curve associated with this stage of flight.

For example, the initial characteristic wind curve $Cc_1$ is identified from the operating point $P_1$ of the aircraft 10. This operating point $P_1$ is at the intersection between the initial characteristic wind curve $Cc_1$ and the wind line Dv0 and it is characterized by the longitudinal ground speed $V_{solP1}$, the longitudinal air speed $V_{airP1}$, and a longitudinal wind speed of zero. In particular manner, for this zero longitudinal wind speed, the longitudinal ground speed $V_{solP1}$ and the longitudinal air speed $V_{airP1}$ are identical.

Thereafter, during a step 33 of maintaining this stage of flight, so long as this stage of flight is conserved, the pilot does not cause the aircraft 10 to accelerate or decelerate along the longitudinal direction, and the operating point of the aircraft 10 moves along the initial characteristic speed curve $Cc_1$ depending on variations in the longitudinal speed of the wind to which the aircraft 10 is subjected. The movements of this operating point thus make it possible to determine the longitudinal air speed $V_{airX}$ and the longitudinal ground speed $V_{solX}$ of the aircraft 10 as a function of variations in the longitudinal speed of the wind.

For example, from the operating point $P_1$, if the longitudinal speed of the wind increases in signed value, i.e. if it varies so that the aircraft 10 is subjected by way of example to a tail wind that becomes stronger, the longitudinal air speed $V_{airX}$ needs to decrease and the longitudinal ground speed $V_{sol}$ needs to increase until reaching a constant longitudinal ground speed $V_{solXLim}$. The longitudinal airspeed $V_{airX}$ is greater than the minimum longitudinal air speed $V_{airXMin}$.

In contrast, from this operating point $P_1$, if the longitudinal speed of the wind decrees in signed value, i.e. if it varies in such a manner that the aircraft 10 is subjected by way of example to a head wind that becomes stronger, the longitudinal ground speed $V_{solX}$ decreases and the longitudinal air speed $V_{airX}$ increases up to a constant air speed $V_{airXLim}$.

Advantageously, this initial characteristic speed curve $Cc_1$ thus makes it possible to define the setpoint longitudinal speed of advance Vc to be used by the autopilot 15 depending on the longitudinal speed of the relative wind to which the aircraft 10 is subjected.

Specifically, each characteristic speed curve for longitudinal air speed $V_{airX}$ less than or equal to the maximum air speed $V_{airXMax}$, has a transition point T1, T2, T3 situated in the middle of the circular arc connecting together the two segments. For operating points having a longitudinal ground speed $V_{solX}$ less than that of the transition point T1, T2, T3, the setpoint longitudinal speed of advance Vc for the autopilot 15 is equal to the longitudinal air speed $V_{airX}$ of the operating point of the aircraft 10. In contrast, for operating points having a longitudinal ground speed $V_{solX}$ greater than that of the transition point T1, T2, T3, the setpoint longitudinal speed of advance Vc for the autopilot 15 is equal to the longitudinal ground speed $V_{solX}$ of the operating point of the aircraft 10.

Thus, from the operating point $P_1$, if the longitudinal speed of the wind increases in signed value, then the longitudinal ground speed $V_{solX}$ remains greater than that of the transition point T1. The setpoint longitudinal speed of advance Vc is then equal to the longitudinal ground speed $V_{solX}$. In contrast, if the longitudinal speed of the wind decreases in signed value, then the setpoint longitudinal speed of advance Vc continues to be equal to the longitudinal ground speed $V_{solX}$ so long as the operating point $P_1$ does not go past the transition point T1. Beyond the transition point T1, the longitudinal ground speed $V_{solX}$ is less than that of the transition point T1 and the setpoint longitudinal speed of advance Vc is equal to the longitudinal air speed $V_{airX}$.

In addition, the characteristic speed curves corresponding to longitudinal air speeds $V_{airX}$ greater than the maximum longitudinal air speed $V_{airXMax}$ are straight lines and they do not have transition points. Specifically, for large longitudinal air speeds $V_{airX}$ that correspond in general to prolonged cruising flights, the setpoint longitudinal speed of advance Vc for the autopilot 15 of the aircraft 10 is generally equal to the longitudinal air speed $V_{airX}$. The setpoint longitudinal speed of advance Vc for the autopilot 15 is then equal to the longitudinal air speed $V_{airX}$ of the characteristic speed curve independently of the longitudinal speed of the wind to which the aircraft 10 is subjected.

The variations in the longitudinal speed of the wind to which the aircraft 10 is subjected may be the result of a change in the direction of the wind or in its modulus or indeed of a change in the orientation of the aircraft 10 relative to the wind. This change of the orientation of the aircraft 10 relative to the wind may be the result of the aircraft 10 turning or it may be the result of a change in the heading $\psi$ of the aircraft 10.

This turn or change of heading $\psi$ may be performed by the autopilot 15 or by an action of the pilot acting by transparency using a cyclic control stick 21, a roll beep, or indeed pedals 23, the stage of flight of the aircraft 10 being conserved, so that the aircraft is subjected neither to acceleration nor to deceleration in the direction of its track.

Finally, during a step 34 of changing stage of flight, as a result of the pilot causing the aircraft 10 to accelerate or decelerate along its longitudinal direction, a new characteristic speed curve is identified on which the new current operating point of the aircraft 10 is to be found once the longitudinal air and ground speeds $V_{airX}$ and $V_{solX}$ have stabilized and become substantially constant.

For example, starting from the operating point $P_1$, if the setpoint longitudinal speed of advance Vc for the autopilot 15, which is equal to the longitudinal ground speed $V_{solXP1}$, increases as a result of the pilot acting by transparency, the aircraft 10 leaves its stage of flight and the longitudinal ground speed $V_{solX}$ is increased to a new operating point $P_2$. This new operating point $P_2$ corresponds to a new stage of flight of the aircraft 10 and is characterized by a new longitudinal ground speed $V_{solXP2}$ and a new longitudinal air speed $V_{airXP2}$. Consequently, the longitudinal speed of the relative wind to which the aircraft 10 is subjected is also modified. The new operating point $P_2$ then makes it possible to identify the new characteristic speed curve $Cc_2$ and the new longitudinal speed of the relative wind to which the aircraft 10 is subjected. The setpoint longitudinal speed of advance Vc for the autopilot 15 relating to this new stage of flight is then equal to the new longitudinal ground speed $V_{solXP2}$.

So long as this new stage of flight is conserved, with the pilot not causing any acceleration or deceleration of the aircraft 10 in its longitudinal direction, the operating point of the aircraft 10 moves along this new characteristic speed curve $Cc_2$ depending on the variations in the longitudinal speed of the wind to which the aircraft 10 is subjected.

Furthermore, these characteristic speed curves enable the longitudinal air speed $V_{airX}$ to be maintained at a speed greater than a minimum longitudinal air speed $V_{airXMin}$. Maintaining the longitudinal air speed $V_{airX}$ greater than the minimum longitudinal air speed $V_{airXMin}$ in spite of a possible increase in the longitudinal ground speed $V_{solX}$ as a result of a strengthening tail wind to which the aircraft 10 is subjected prevents the aircraft 10 from decelerating in a mass of air that has been churned by its main rotor 11, which could lead to a dangerous situation.

Furthermore, from an operating point $P_3$ corresponding to a longitudinal air speed $V_{airXP3}$ equal to the minimum longitudinal air speed $V_{airXMin}$ and to a setpoint longitudinal speed of advance Vc equal to the ground speed $V_{solXP3}$, when the aircraft is being subjected to a tail wind that becomes stronger, the characteristic speed curve $Cc_3$ is replaced by a new characteristic speed curve $Cc_4$. Specifically, since the longitudinal air speed $V_{airXP3}$ is already equal to the minimum longitudinal air speed $V_{airXMin}$, it cannot be reduced to accompany the drop in the longitudinal speed of the wind corresponding to a strengthening of the tail wind. As a result, the longitudinal ground speed $V_{solXP3}$ of the aircraft must be increased up to a longitudinal ground speed $V_{solXP4}$ so that the longitudinal air speed $V_{airXP4}$ remains equal to the minimum longitudinal air speed $V_{airXMin}$, the operating point $P_3$ then becoming an operating point $P_4$.

Likewise, when the longitudinal ground speed $V_{solX}$ is equal to the minimum longitudinal ground speed $V_{solXMin}$, and the longitudinal speed of the relative wind to which the aircraft 10 is subjected decreases in signed value, e.g. corresponding to a strengthening head wind, the characteristic speed curve that needs to be taken into account changes so that the longitudinal air speed $V_{airX}$ increases and the longitudinal ground speed $V_{solX}$ continues to be equal to the minimum longitudinal ground speed $V_{solXMin}$.

Furthermore, in these two situations, in order to avoid untimely changes in the characteristic speed curve as a result of the slightest fluctuation in the longitudinal speed of the wind to which the aircraft 10 is subjected, a protective threshold is taken into account. By way of example, the variation in the longitudinal speed of the wind is compared with a fixed protective threshold or with a threshold having hysteresis.

Furthermore, the minimum longitudinal air speed $V_{airXMin}$ and the minimum longitudinal ground speed $V_{solXMin}$ may be fixed values as shown in FIG. 4. The minimum longitudinal air speed $V_{airXMin}$ and the minimum longitudinal ground speed $V_{solXMin}$ may also be variable as a function of the modulus of the total speed of the relative wind to which the aircraft 10 is subjected, as shown in FIG. 5.

By way of example, for total wind speed modulus greater than or equal to 40 kt, the minimum longitudinal air speed $V_{airXMin}$ is constant and equal to a high limit value $V_{LimH}$. The minimum longitudinal air speed $V_{airXMin}$ is constant and equal to a low limit value $V_{LimB}$ for total wind speed moduli less than or equal to 10 kt. This minimum longitudinal air speed $V_{airXMin}$ decreases linearly from the high limit value $V_{LimH}$ to the low limit value $V_{LimB}$ with lowering of the modulus of the longitudinal wind speed between 40 kt and 10 kt.

Naturally, the present invention may be subjected to numerous variations as to its implementation. Although several embodiments are described, it will readily be understood that it is not conceivable to identify exhaustively all possible implementations. It is naturally possible to envisage replacing any of the means described by equivalent means without going beyond the ambit of the present invention.

In particular, the aircraft 10 with this system 1 for determining the longitudinal air speed $V_{airX}$ and the longitudinal ground speed $V_{solX}$ is not limited to the aircraft 10 shown in FIG. 1. By way of example, the aircraft 10 may have two main rotors or it may be a hybrid helicopter.

Furthermore, the number of main blades 111, 112, 113 of a main rotor 11, and the number of secondary blades 121, 122, 123, 124 of a tail rotor 12 are not limited to the example aircraft 10 shown in FIG. 1. A main rotor 11 or a tail rotor 12 may have two, three, four, five, or even more than five blades.

What is claimed is:

1. A method of determining the longitudinal air speed $V_{airX}$ and the longitudinal ground speed $V_{solX}$ of a rotary wing aircraft depending on the exposure to the wind of the aircraft, the aircraft flying along a track $T_{sol}$ relative to the ground with a speed of advance Va, which speed of advance Va may be determined relative to the ground in order to form a ground speed $V_{sol}$ and relative to the air in order to form an air speed $V_{air}$, a longitudinal direction X extending from the rear of the aircraft towards the front of the aircraft, an elevation direction Z extending upwards perpendicularly to the longitudinal direction X, and a transverse direction Y extending from right to left perpendicularly to the longitudinal and elevation directions X and Z, the aircraft comprising:

an autopilot for generating control signals in compliance with predefined modes of operation and in compliance with flight setpoints, the control signals being capable of causing the aircraft to perform movements in rotation and/or translation relative to the directions (X, Y, Z);

at least one control means enabling a pilot of the aircraft to pilot the aircraft by transparency while the autopilot is in operation; and at least one computer and at least one memory;

wherein the memory stores characteristic speed curves for the aircraft defining the longitudinal ground speed $V_{solX}$ and the longitudinal air speed $V_{airX}$ of the aircraft as a function of a longitudinal speed of the relative wind to which the aircraft is being subjected, each characteristic speed curve corresponding to a stage of flight of the aircraft and being made up of operating points of the aircraft, each operating point being characterized by a longitudinal ground speed $V_{solX}$ and by a longitudinal air speed $V_{airX}$ in a coordinate system having a longitudinal ground speed $V_{solX}$ of the aircraft up the ordinate axis and the longitudinal air speed $V_{airX}$ of the aircraft along an abscissa axis, a stage of flight corresponding to a flight of the aircraft during which a pilot of the aircraft does not cause any acceleration or deceleration of the aircraft along the longitudinal direction X, the method comprising the following steps:

during an initialization step, for a current stage of flight of the aircraft, identifying an initial characteristic speed curve on which the current operating point of the aircraft lies;

for the current stage of flight, controlling the longitudinal air and ground speeds $V_{airX}$ and $V_{solX}$ of the aircraft as a function of the variation of the total speed of the wind on the longitudinal direction X so that the current operating point of the aircraft moves on the initial characteristic speed curve; and following the pilot taking action on the longitudinal direction to cause the aircraft to accelerate or decelerate, identifying a new characteristic speed curve on which the current operating point of the aircraft lies once the longitudinal air and ground speeds $V_{airX}$ and $V_{solX}$ have stabilized and are substantially constant.

2. A method according to claim 1, wherein a setpoint is applied to the autopilot for a longitudinal speed of advance Vc equal to the longitudinal ground speed $V_{solX}$ corresponding to the current operating point, or else for a longitudinal air speed $V_{airX}$ corresponding to the current operating point, depending on the longitudinal speed of the wind and on the position of the current operating point on the characteristic speed curve.

3. A method according to claim 1, wherein each characteristic speed curve is made up of a horizontal first segment corresponding to a constant longitudinal ground speed $V_{solX}$, a circular arc, and a vertical second segment corresponding to a constant longitudinal air speed $V_{airX}$.

4. A method according to claim 3, wherein the setpoint forward speed of advance Vc applied to the autopilot is equal to the longitudinal ground speed $V_{solX}$ of the operating point when the operating point is situated on the first segment or on a first portion of the circular arc situated between the first segment and a transition point of the circular arc, and the setpoint longitudinal speed of advance Vc applied to the autopilot is equal to the longitudinal air speed $V_{airX}$ of the operating point when the operating point is situated on the second segment or on a second portion of the circular arc situated between the transition point of the circular arc and the second segment.

5. A method according to claim 1, wherein the setpoint longitudinal speed of advance Vc applied to the autopilot is equal to the longitudinal air speed $V_{airX}$ independently of the longitudinal speed of the relative wind to which the aircraft is subjected when the longitudinal air speed $V_{airX}$ is greater than a maximum longitudinal air speed $V_{airXMax}$.

6. A method according to claim 1, wherein the longitudinal ground speed $V_{solX}$ is greater than or equal to a minimum longitudinal ground speed $V_{solXMin}$.

7. A method according to claim 6, wherein when the longitudinal ground speed $V_{solX}$ is equal to a minimum longitudinal ground speed $V_{solXMin}$ and the longitudinal speed of the relative wind to which the aircraft is subjected decreases in signed value, the characteristic speed curve for the aircraft that is to be taken into account changes, the setpoint longitudinal speed of advance Vc being such that the longitudinal air speed $V_{airX}$ increases and the longitudinal ground speed $V_{solX}$ is equal to the minimum longitudinal air speed $V_{solXMin}$.

8. A method according to claim 1, wherein the longitudinal air speed $V_{airX}$ is greater than or equal to a minimum longitudinal air speed $V_{airXMin}$ in order to avoid the aircraft operating in a mass of air that has already been churned by a main rotor of the aircraft which would then risk generating a loss of lift from the main rotor.

9. A method according to claim 8, wherein the minimum air speed $V_{airXMin}$ is variable as a function of the modulus of the total speed of the relative wind to which the aircraft is subjected.

10. A method according to claim 8, wherein when the longitudinal air speed $V_{airX}$ is equal to the minimum longitudinal air speed $V_{airXMin}$ and the longitudinal speed of the relative wind to which the aircraft is subjected increases in signed value, the characteristic speed curve for the aircraft that is to be taken into account changes, the setpoint longitudinal speed of advance Vc being such that the longitudinal ground speed $V_{solX}$ increases and the longitudinal air speed $V_{airX}$ is equal to the minimum longitudinal air speed $V_{airXMin}$.

11. A method according to claim 1, wherein when the longitudinal air speed $V_{airX}$ is equal to the minimum longitudinal air speed $V_{airXMin}$ or when the longitudinal ground speed $V_{solX}$ is equal to a minimum longitudinal ground speed $V_{solXMin}$, the characteristic speed curve to be taken into account is changed when a variation in the longitudinal speed of the relative wind to which the aircraft is subjected is greater than or equal to a protective threshold.

12. A method according to claim 1, wherein when the longitudinal air speed $V_{airX}$ is equal to the minimum longitudinal air speed $V_{airXMin}$ or when the longitudinal ground speed $V_{solX}$ is equal to a minimum longitudinal ground speed $V_{solXMin}$, the characteristic speed curve to be taken into account is changed when a longitudinal speed of the relative wind to which the aircraft is subjected varies relative to a threshold with hysteresis.

13. A method according to claim 8, wherein when the longitudinal air speed $V_{airX}$ is equal to the minimum longitudinal air speed $V_{airXMin}$ and the pilot of the aircraft voluntarily reduces the longitudinal air speed $V_{airX}$ to below the minimum longitudinal air speed $V_{airXMin}$, a new minimum longitudinal air speed $V_{airXMin2}$ is defined as being equal to the longitudinal air speed $V_{airX}$ selected by the pilot minus a predetermined value $V_\delta$ and replaces the minimum longitudinal air speed $V_{airXMin}$ until the longitudinal air speed $V_{airX}$ becomes greater than or equal to the minimum longitudinal air speed $V_{airXMin}$ plus the predetermined value $V_\delta$.

14. A method according to claim 6, wherein when the longitudinal ground speed $V_{solX}$ is equal to the minimum longitudinal ground speed $V_{solXMin}$ and the pilot of the aircraft voluntarily reduces the longitudinal ground speed $V_{solX}$ below the minimum longitudinal ground speed $V_{solXMin}$, the longitudinal ground speed $V_{solX}$ is maintained in compliance with the controls issued by the pilot.

15. A system for determining the longitudinal air speed $V_{airX}$ and the longitudinal ground speed $V_{solX}$ of a rotary wing aircraft depending on the exposure to the wind of the aircraft, the aircraft flying along a track $T_{sol}$ relative to the ground with a speed of advance Va, the speed of advance Va potentially being determined relative to the ground to form a ground speed $V_{sol}$ and relative to the air to form an air speed $V_{air}$, a longitudinal direction X extending from the rear of the aircraft towards the front of the aircraft, a direction in elevation Z extending upwards perpendicularly to the longitudinal direction X, and a transverse direction Y extending from right to left perpendicularly to the longitudinal and elevation directions X and Z,
   the aircraft comprising:
      an autopilot for generating control signals in predefined modes of operation and in compliance with flight setpoints, the control signals being capable of causing the aircraft to move in rotation and/or translation relative to the directions (X, Y, Z); and
      at least one control means enabling the pilot to pilot the aircraft by transparency while the autopilot is in operation;
   the system comprising:
      at least one computer; and
      at least one memory;
   wherein the system for determining the longitudinal air speed $V_{airX}$ and the longitudinal ground speed $V_{solX}$ performs the method according to claim 1.

* * * * *